(12) United States Patent
Baset et al.

(10) Patent No.: US 10,296,745 B2
(45) Date of Patent: May 21, 2019

(54) DETECTING VULNERABLE APPLICATIONS

(71) Applicant: INTERNATIONAL BUSINESS MACHINES CORPORATION, Armonk, NY (US)

(72) Inventors: Salman A. Baset, New York, NY (US); Philippe Suter, New Yok, NY (US); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 15/191,314

(22) Filed: Jun. 23, 2016

(65) Prior Publication Data

US 2017/0372072 A1 Dec. 28, 2017

(51) Int. Cl.
*H04L 29/06* (2006.01)
*G06F 21/57* (2013.01)
*G06F 9/54* (2006.01)
*G06F 11/36* (2006.01)
*G06F 17/30* (2006.01)

(52) U.S. Cl.
CPC .............. *G06F 21/57* (2013.01); *G06F 9/542* (2013.01); *G06F 11/3668* (2013.01); *G06F 17/30312* (2013.01); *G06F 21/577* (2013.01); *G06F 2221/033* (2013.01)

(58) Field of Classification Search
CPC ........................... G06F 21/60; G06F 2221/033
See application file for complete search history.

(56) References Cited

U.S. PATENT DOCUMENTS

2014/0245376 A1* 8/2014 Hibbert ............... H04L 63/1433
726/1
2015/0379271 A1* 12/2015 Allen .................... G06F 21/577
726/25
2016/0259934 A1* 9/2016 Rozenberg ............. G06F 21/44

OTHER PUBLICATIONS

Kolehmainen, R., "IntelliGuard-Plugins"; JetBrains s.r.o; Dec. 25, 2012; 5 pgs.
ProGuard, Guardsquare nv (2016-2018); https://www.guardsquare.com/en/products/proguard/support; 4 pgs.
(Continued)

*Primary Examiner* — Jason K Gee
(74) *Attorney, Agent, or Firm* — Intelletek Law Group, PLLC; Gabriel Daniel, Esq.

(57) ABSTRACT

A method and system of determining a vulnerability of software. Libraries are downloaded and stored in a database. For each library, a set of features are extracted and stored in a library index table of the database. For each library, it is determined whether it poses a security concern and flagged accordingly in the library index table. Applications are downloaded and stored in the database. For each application a set of features are extracted and stored in an application index table of the database. For each application, the set of features of the application of the application are compared to the set of features of each of the libraries in the library index table to identify which libraries in the library index table are associated with the application. For each application, a name of the application and names of the associated libraries are stored in a vulnerability reference table in the database.

16 Claims, 10 Drawing Sheets

(56) References Cited

OTHER PUBLICATIONS

Wikipedia, Obfuscation (Software); http://en.wikipedia.org/wiki/Obfuscation_(software); 7 pgs. last edited May 29, 2018.
Yguard—Java Bytecode Obfuscator and Shrinker; https://yworks.com/products/yguard; 4 pgs.
Yguard 2.5—Ant Java Bytecode Obfuscator and Shrinker—Documentation; https://yworks.com/resources/yguard/yguard_ant_howto.html; (2002-2013); 25 pgs.

* cited by examiner

DETECTING VULNERABLE APPLICATIONS

BACKGROUND

Technical Field

The present disclosure generally relates to security tools, and more particularly to detecting the vulnerability of applications that use software libraries.

Description of the Related Art

Compact, feature specific software applications, commonly referred to as "apps," have become ubiquitous on a wide array of computing devices, including smart phones, tablets, televisions, and other devices, collectively referred to herein as user devices (UD's). With the ever increasing number of available applications on different platforms, they can represent a significant security risk when stored on a computing device. Given the open nature of some application platforms, applications may come from a wide variety of sources and may not be rigorously tested for vulnerabilities.

One potential source of vulnerability is through software libraries, open source or otherwise. In addition to the standard libraries supported by any given programming platform, such a Java, there are many other proprietary and open source libraries available to program developers. Use of these libraries is attractive for reducing development time and increasing the availability of features and common interfaces. However, not all libraries are safe. Indeed, since libraries may be widely distributed, they can be an easily accessible source of attack by hackers and/or malware. Nefarious programmers may intentionally distribute libraries that they know how to exploit. In some scenarios, a programmer may carelessly use libraries with known vulnerabilities. When such a library is used in an application program, the library is often statically linked to the application program. Thus, the libraries may be compiled into an executable package that is distributed to user devices, perpetuating the potential vulnerabilities to other UD's. Once these libraries are compiled into the executable software application, the actual code of the library may be obfuscated. In this regard, application developers are typically not required to identify what libraries they have used. Even if a programming language supports distribution in a human readable code, applications are often obfuscated to save space and/or prevent reverse engineering, which makes any integrated libraries difficult to detect. So, an end user downloading and using an application, may not be aware that a library with security concerns has been included in an application they are using on their UD. It is with respect to these considerations and others that the present disclosure has been written.

SUMMARY

According to various exemplary embodiments, a computing device, a non-transitory computer readable storage medium, and a method are provided to determine the vulnerability of software. Libraries are downloaded and stored in a database. For each library, a set of features is extracted and stored in a library index table of the database. For each library, it is determined whether it poses a security concern and flagged accordingly in the library index table. Applications are downloaded and stored in the database. For each application a set of features are extracted and stored in an application index table of the database. For each application, the set of features of the application of the application index table are compared to the set of features of each of the libraries in the library index table to identify which libraries in the library index table are associated with the application. For each application, a name of the application and names of the associated libraries are stored in a vulnerability reference table in the database.

According to one exemplary embodiment, a request is received from a user device (UD) over a network to verify a security of a target application, wherein the request includes an identifier of the target application. Upon determining that the target application is not included in the vulnerability reference table, the target application is requested from the UD and/or an application store. Upon receiving the target application, the target application is stored in the database. A set of features of the target application are extracted and stored in the application index table of the database. The set of features of the target application are compared to the set of features of each of the libraries in the library index table to identify what libraries are associated with the target application. A name of the target application and names of the associated libraries are stored in a vulnerability reference table in the database.

According to one exemplary embodiment, upon determining that a library associated with the target application is flagged to be a security concern, a notification of the security concern to the UD.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure relates to detecting the vulnerability of applications using software libraries. Libraries are downloaded and stored in a database. For each library, a set of features are extracted and stored in a library index table of the database. For each library, it is determined whether it poses a security concern and flagged accordingly in the library index table. Applications are downloaded and stored in the database. For each application a set of features are extracted and stored in an application index table of the database. For each application, the set of features of the application of the application index table are compared to the set of features of each of the libraries in the library index table to identify which libraries in the library index table are associated with the application. For each application, a name of the application and names of the associated libraries are stored in a vulnerability reference table in the database.

Reference now is made in detail to the examples illustrated in the accompanying drawings and discussed below.

Example Architecture

Figure 1:
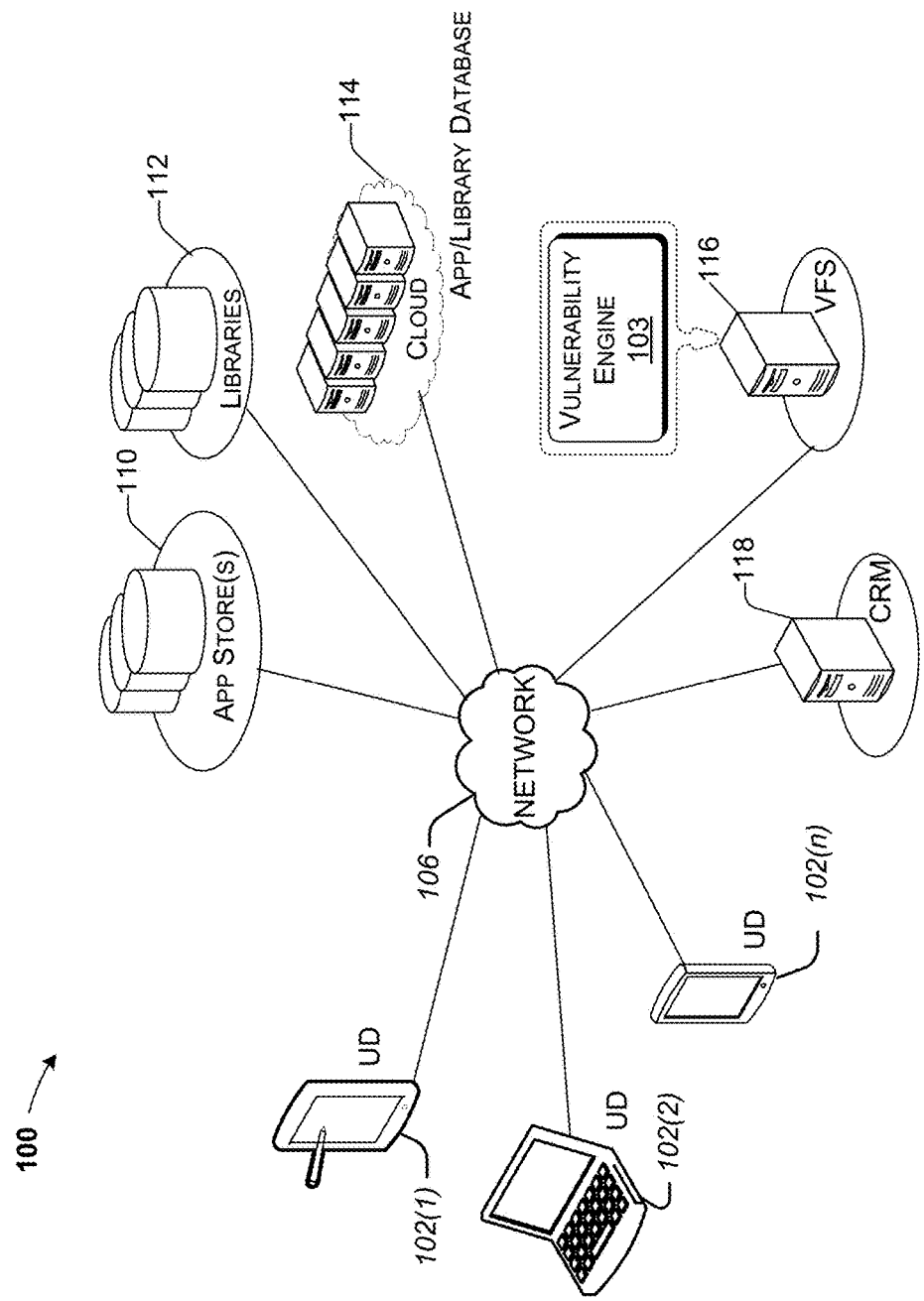
FIG. 1 illustrates an example architecture for implementing a software application vulnerability determination system.

FIG. 1 illustrates an example architecture 100 for implementing a software vulnerability detection system. Architecture 100 includes a network 106 that allows various user devices 102(1) to 102(n) to communicate with each other, as well as any other components that are connected to the network 106, such as one or more software application stores 110, libraries 112, an application database 114, a vulnerability finding server (VFS) 116, and a customer relations management (CRM) server 118.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users. The network 106 allows users of the software vulnerability service guided by a vulnerability engine software 103 of the VFS 116 to determine whether any of the applications stored in a memory of a UD are vulnerable to malicious activity (e.g., traffic), such as Botnet, distributed denial of service (DDoS), malware, unlicensed use of an application of library, and the like, collectively referred to herein as a security concern.

For purposes of later discussion, several UD's appear in the drawing, to represent some examples of the devices that may receive various services via the network 106. Today, UD's typically take the form of portable handsets, smartphones, tablet computers, personal digital assistants (PDAs), and smart watches, although they may be implemented in other form factors, including consumer, and business electronic devices.

A UD (e.g., 102(1)) may have various applications stored in its memory and may supplement these applications with additional applications from various application stores, represented herein by application store(s) 110. The application store(s) 110 provide applications and updates thereof to UD's over the network 106. The application store(s) 110 may also provide a facsimile of its applications to the app/library database 114 upon request from the VFS 116, at predetermined intervals, and/or when a new application is introduced by a developer into the application store(s) 110. In some scenarios, an application may present a security concern to the UD (e.g., 102(1)), which may be identified and/or deactivated by the system discussed herein.

The applications stored in a UD (e.g., 102(1)) may invoke and/or have been created using one or more libraries, similar to libraries 112 of architecture 100. As used herein, a library is a collection of non-volatile resources that may have been invoked by the application or used to develop the application that can be stored in the UD (e.g., 102(1)). For example, such libraries may include configuration data, message templates, subroutines, documentation, help data, etc. Library code may be organized in a way that allows it to be used by multiple applications that may have no connection to each other, while code that is part of an application may be organized to be used within that particular app. Known locations of the libraries 112 may include, among others, Bintray, GitHub, Apache Maven, etc.

Such libraries 112 are generally configured to be reused by various applications (e.g., programs or sub-programs), and the user and/or developer may not know the internal details, and thus, the vulnerabilities of the library 112. When a program invokes a library 112, it gains the behavior implemented inside that library 112 without having to create that behavior. While these libraries 112 help disburden an application developer from having to recreate behaviors, the libraries 112 may usher in a security concern to a UD, which can be identified and blocked by the VFS 116 (e.g., by way of the vulnerability engine 103).

A software application (e.g., from an application store 110) that is stored on a UD may be associated with one or more libraries 112. The application will therefore include features, such as statistically improbable strings corresponding to unique names used in a particular library. These features survive obfuscation and may be detected even in compiled or obfuscated code. Additional code features that survive obfuscation are also possible.

The application/library database 114 is configured to store applications and libraries from known sources, represented herein by application store(s) 110 and libraries 112. Known application stores may include Google apps, iTunes, Amazon app store, etc. A non-exhaustive example list of known locations of libraries was mentioned previously. The app/library database 114 is used as a resource center for the vulnerability engine 103 of the VFS 116. For example, the app/library database 114 may be used by the vulnerability engine 103 to extract, for each library, a unique set of features that survive obfuscation when used in an application. The unique set of features for each library is used to create an index table of library features.

Similarly, for each application stored in the database 114, the vulnerability engine 103 may extract a second set of features that survive obfuscation related to libraries that may have been used to develop the application. These second set of features are used to create an index table of application features, which are then correlated with the index table of library features, to determine the libraries (and versions thereof) that may have been used to develop a subject application. Accordingly, the index table of library features and the index table of application features can be used to create a vulnerability reference table that may include for each application, without limitation, a name of the application, a version identifier, the libraries used and versions thereof, a vulnerability flag (and level thereof), metadata of the application, etc.

While the app/library database 114 is illustrated by way of example to be part of a common platform, it will be understood that in one embodiment, the application database and the library database may be separate databases. In other embodiments, the app/library database may comprise virtual computing devices in the form of virtual machines or software containers that are hosted in a cloud, thereby providing an elastic architecture for processing and storage. The app/library database 114 may be maintained by a security software company or a consortium of organizations and/or individuals interested in software security to provide an up-to-date resource for identifiable software libraries that represent potential security risk.

The VFS 116 is configured to provide application security services to the UD's (102(1) to 102(n)) as well as application developers. To that end, the vulnerability engine 103 running on the VFS 116 that is operative to download software libraries 112 and store them in the app/library database 114. For each library, characteristics of the library, such as unique features that survive obfuscation, are identified. A subset of the features that survive obfuscation may represent a unique pattern, fingerprint, or signature that indicates that an identifiable software library has been included in the target software application. Each library in the app/library database is scanned to determine whether it poses a security concern when run on a UD. Thus, for each library, the vulnerability engine 103 extracts features of the library and determines whether the library poses a security concern. In various embodiments, these results may be stored in the library index table in the app/library database 114 and/or the VFS 116.

Further, the vulnerability engine 103 is operative to download applications from known application stores 110 and store them in the app/library database 114. For each application stored in the app/library database 114 features of the application are identified and stored in the application index table in the app/library database 114 and/or the VFS 116. A correlation is then performed between the application index table and the library index table to determine what (if any) of the libraries are used in the corresponding application, based on a commonality between the extracted features of the library and the application. Additional functionality of the vulnerability engine 103 of the VFS 116 and its interaction with the UD's and resources of the architecture 100 are discussed in more detail in a later section.

In one embodiment, the Customer Relationship Manager (CRM) server 118 offers its account holders (e.g., subscribers of the software vulnerability service) on-line access to a variety of information related to the account holders' account, such as on-line payment information, subscription changes, names of vulnerable programs and alternatives therefor, etc. In one embodiment, the CRM server 118 includes the names and versions of all the programs that are stored on a UD associated with the account.

Figure 2:
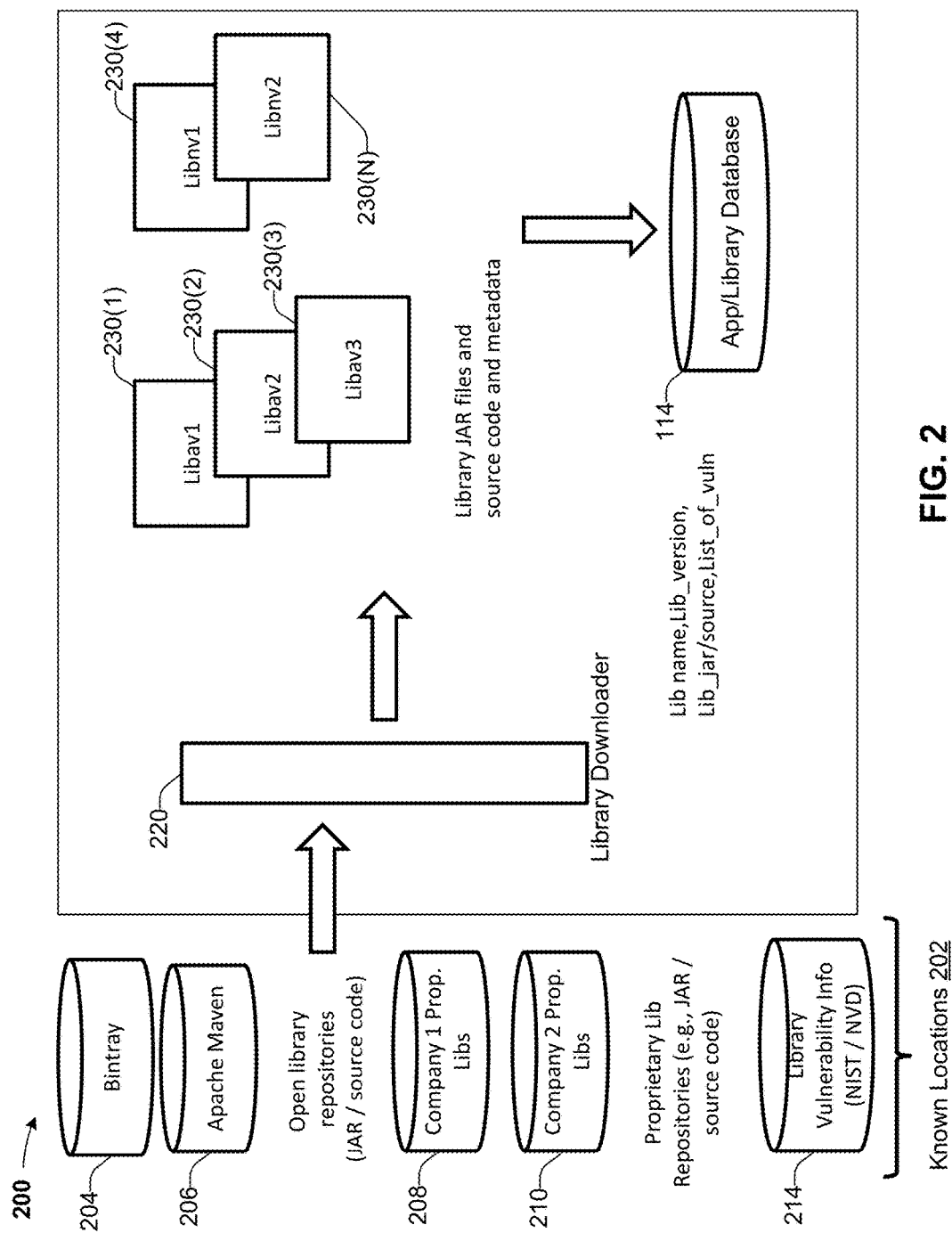
FIG. 2 illustrates a block diagram of a system that may be used to download libraries, consistent with an exemplary embodiment.

FIG. 2 illustrates an example block diagram of a system 200 that may be used to download libraries. The vulnerability engine 103 of the VFS 116 includes a library downloader 220 that is configured to interact with known locations 202 of libraries to download the available libraries. Some libraries may include, without limitation, Bintray 204, Apache Maven 206, and other open library repositories, in the form of Java Archive (JAR) and or source code. Libraries may also be provided by various developers, represented by company 1 (208) and company 2 (210). In some embodiments, a developer may send a proprietary library to the software application vulnerability determination system discussed herein, through the library downloader 220 to confirm that the library does not to pose a security concern.

In one embodiment, vulnerability information regarding available libraries is provided by a consortium or repository such as the National Vulnerability Database (NVD) and/or the National Institute of Standards and Technology (NIST) 214, which are government agencies that provide repositories of standards-based vulnerability management data. For example, data from the NVD may provide security checklists, security related software flaws, etc., that may be downloaded by the library downloader 220.

Each downloaded library may have different versions. For example, library A may have versions 1 (230(1)) to 3 (230(3)) and library B may have versions 1 (230(4)) to N (230(N)). These downloaded libraries 230(1) to 230(N) may ultimately be stored in the app/library database 114 for further processing.

Figure 3:
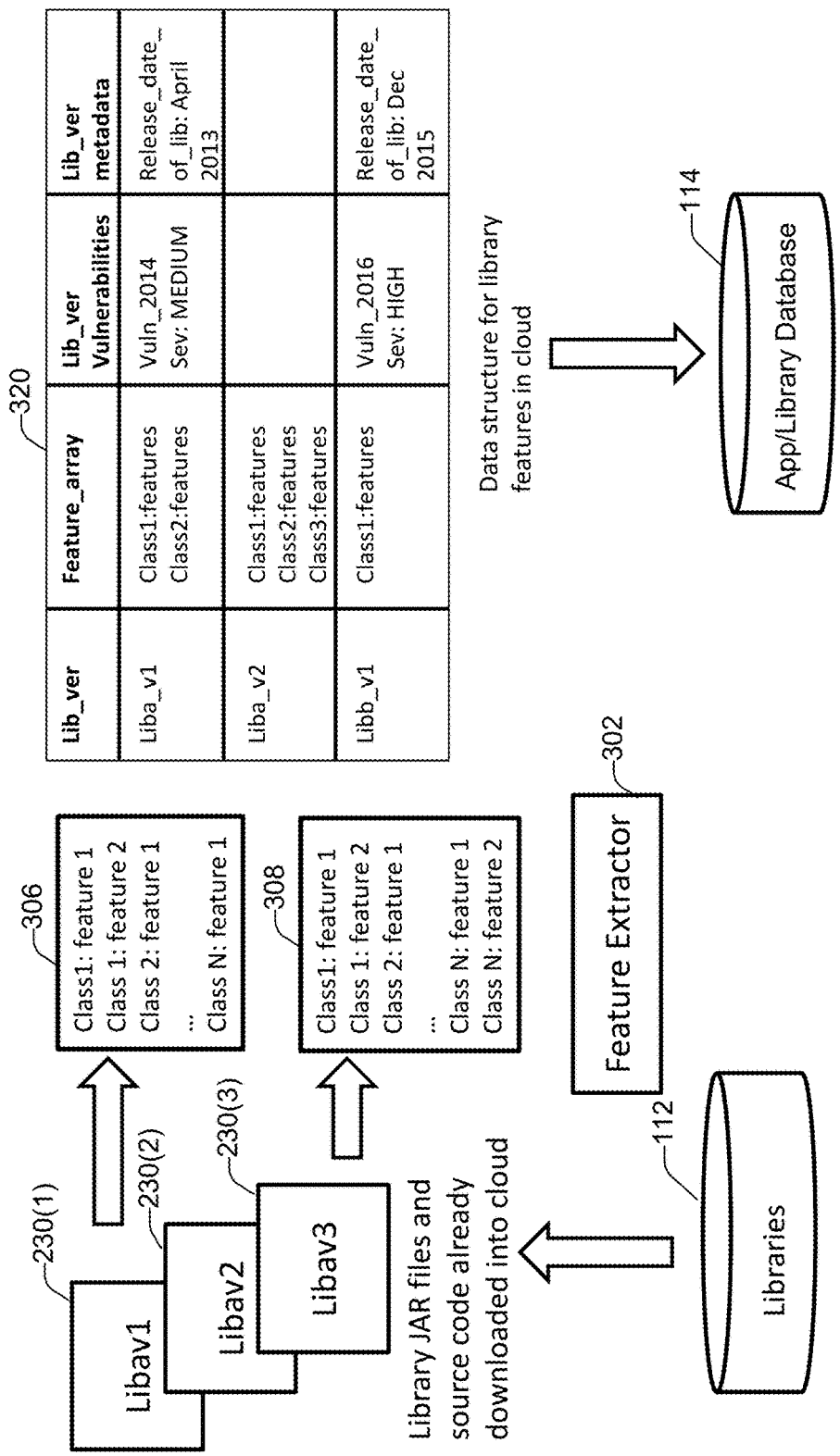
FIG. 3 is a block diagram that illustrates an extraction phase of the downloaded libraries, consistent with an exemplary embodiment.

FIG. 3 is an example block diagram that illustrates an extraction phase of the downloaded libraries 112. To that end, the vulnerability engine 103 of the VFS 116 includes a feature extractor module 302 that is configured to extract features of the libraries 112 that have been downloaded to the app/library database 114, as represented by way of example by libraries 230(1) to 230(3).

The feature extractor 302 of the library vulnerability engine 103 (in the VFS 116) analyzes a target library (e.g., Libav1 (230(1))), generally by evaluating source or un-obfuscated code that is available for open source and many other libraries. Based on the programming language used and known characteristics of how that software is compiled and used to interact with common libraries 112 or other system resources, a set of features that survive obfuscation can be defined.

For example, in the Java programming language, superclass names, standard class instances, and standard function calls can be identified as surviving obfuscation. In addition, in almost all languages programmers include strings, such as function, class, variable, and constant names and/or values, some of which create unique (or at least less common) and consistent corresponding strings in the executable code. This list of characteristics or features 306 can be used by the feature extractor 302 of the library vulnerability engine 103 to analyze the code of a library written in the corresponding language and identify a set of features that are unique to that library (e.g., a library signature). For example, the extracted features 306 related to the library Libav1 230(1) are different from the extracted features 308 of Libav3 230(3).

In one embodiment, the library signature can be statistically validated based on the probabilities of individual features and their combinations using known statistical analysis against a repository of other known libraries and their signatures. The library vulnerability engine 103 of the VFS 116 can then store that library signature for further processing in the app/library database 114 in the form of a library index table 320. In some embodiments, library signatures may be created with hierarchical subsets of features that may provide additional utility in identifying use within an application. For example, in an object oriented programming language, it may be desirable to generate specific signatures for each object, such as a class or function, which could be included within a software application. In another example, some libraries exist in multiple version with slight variations in their signature between versions. It may be helpful to be able to identify a feature set that represents the library regardless of the version, as well as variations on the signature that correspond to a specific version of the library. It is often the case that a vulnerability exists in one version of a library but not the other. Accordingly, the version of the library may be relevant to assessing the risk of an application into which the library is included. Each library and version thereof includes a vulnerability risk score. The score may be alpha-numeric (e.g., 0 to 10, A to F), descriptive (e.g., none, low, medium, and high), based on color (e.g., red, green, and yellow), or any other suitable rating scale.

Figure 4:
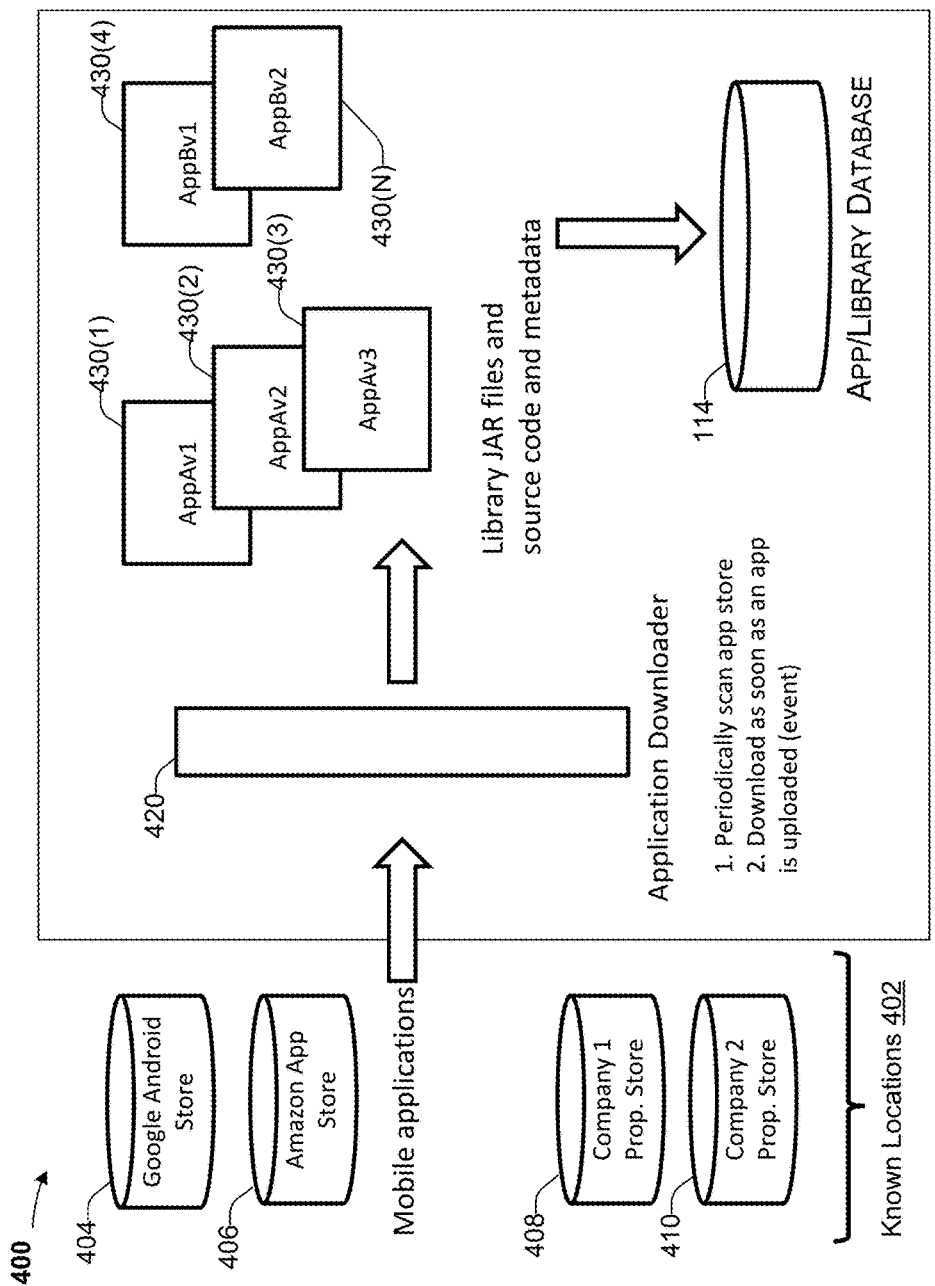
FIG. 4 is a block diagram that illustrates a downloading of applications phase, consistent with an exemplary embodiment.

FIG. 4 is an example block diagram that illustrates downloading of applications phase. The vulnerability engine 103 of the VFS 116 includes an application downloader 420 that is configured to interact with known locations 402 of applications to download the available applications. In one embodiment, the application downloader 420 is the same module as the library downloader 220 of FIG. 2. In various embodiments, these applications may be for mobile or non-mobile devices. Some applications may include, without limitation, the Google Android store 404, Amazon App store 406, and other known locations 402 for applications. Applications may also be provided by various developers, represented by company 1 (408) and company 2 (410). In some embodiments, a developer may send a proprietary application to the software application vulnerability determination system discussed herein, through the application downloader 420 to confirm that the application does not to pose a security concern. These submissions may be anonymous in that personally identifiable information (PII) is not required by the vulnerability engine 103.

Each downloaded application may have different versions. For example, application A may have versions 1 (430(1)) to 3 (430(3)) and library B may have versions 1 (430(4)) to N (430(N)). These downloaded applications 430(1) to 430(N) may ultimately be stored in the app/library database 114 for further processing.

Figure 5:
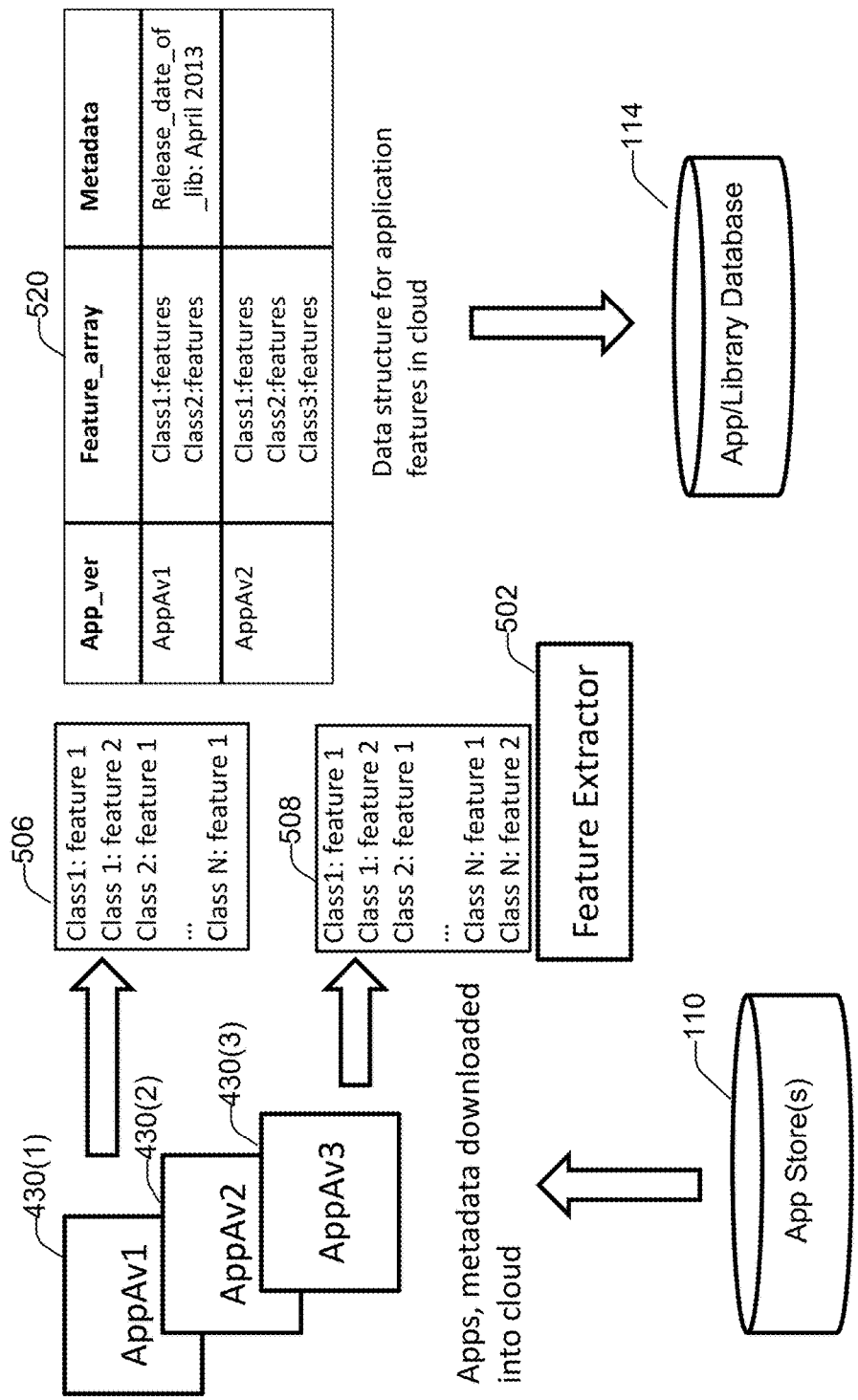
FIG. 5 is a block diagram that illustrates an extraction phase of the downloaded applications, consistent with an exemplary embodiment.

FIG. 5 is an example block diagram that illustrates an extraction phase of the downloaded applications 430(1) to 430(3) from the application store(s) 110. To that end, the vulnerability engine 103 of the VFS 116 includes a feature extractor module 502 that is configured to extract features of the applications that have been downloaded to the app/library database 114, as represented by way of example by applications 430(1) to 430(3). In one embodiment, the feature extractor 502 that is used for the applications is the same feature extractor 302 that is used for the libraries 302.

In one embodiment, the feature extractor 502 of the vulnerability engine 103 that is running on the VFS 116 uses library signatures from the library index table 320 to search the obfuscated code of a target software application (e.g., 430(1)) on the App/Library Database 114. The feature extractor 502 may use the same set of features for a given programming language that was used before to create the library signatures for the library index table 320. For example, the feature extractor 502 may scan the bytecode of a software application (e.g., 430(1)) written in the Java programming language for strings or vectors corresponding to each feature of interest. In one example, the feature extractor 502 may search the code of the target software application (e.g., 430(1)) for each feature present in a library signature of interest found in the library index table 320 to generate a profile of matching features for analysis.

In another example, the code of the target software application (e.g., 430(1)) is searched for all features surviving obfuscation to create a signature for the target software application (e.g., 430(1)) and a plurality of library signatures can be compared with the signature of the target software application (e.g., 430(1)) by the vulnerability engine 103. The code search may conducted and results organized according to functional groupings of features within the code, as illustrated by blocks 506 and 508. For example, a set of features corresponding to each class within an object-oriented library may be used to organize the search and results, enabling the results to be analyzed by the vulnerability engine 103 on a per class basis.

Figure 6:
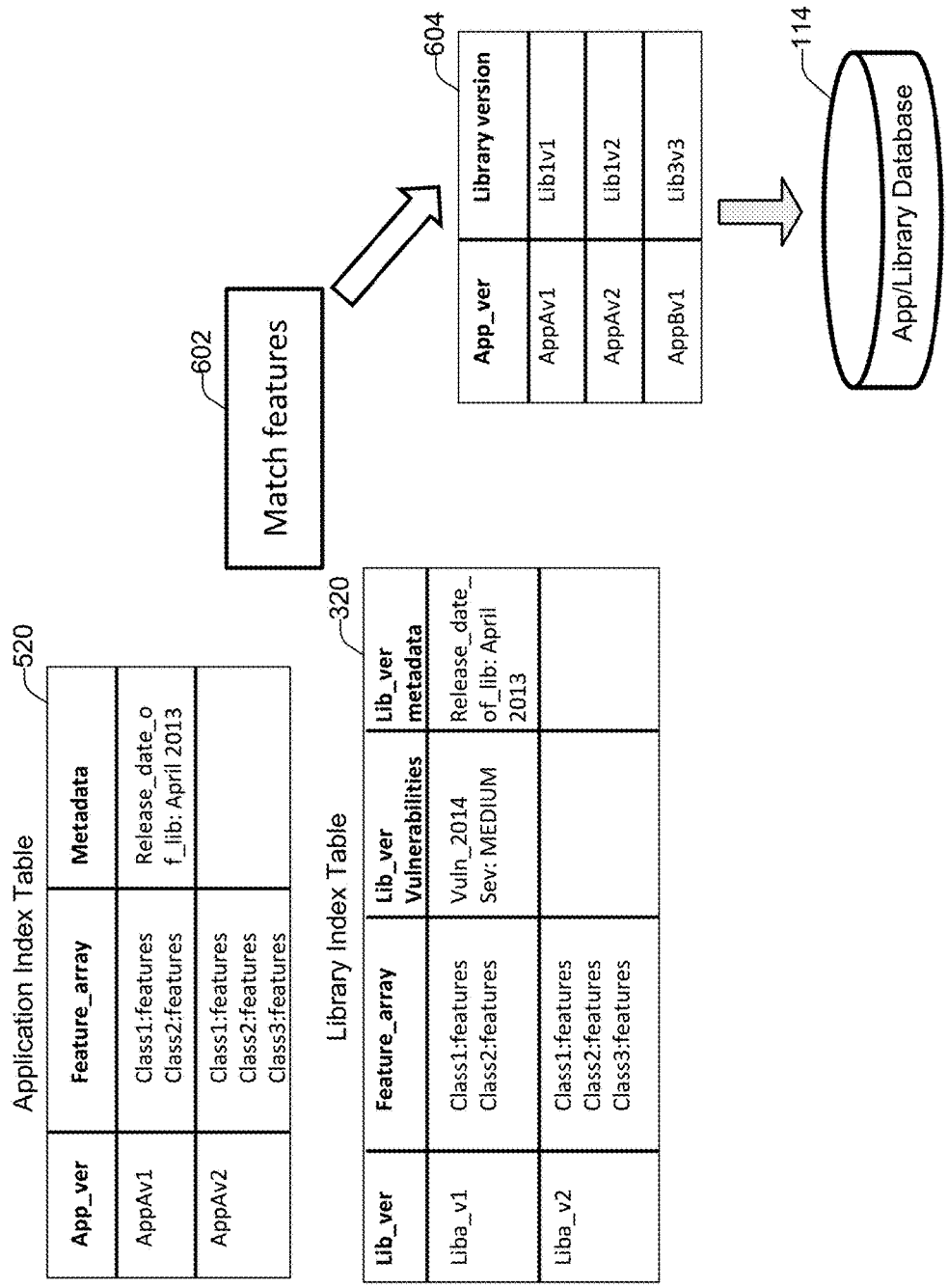
FIG. 6 is a block diagram that describes a match phase, consistent with an exemplary embodiment.

FIG. 6 is an example block diagram that describes a match phase, where features of the library index table 320 are correlated with the features of the application index table 520. To that end, the vulnerability engine 103 of the VFS 116 includes a match features module 602 that is configured to determine which libraries are present for each application. The results may be stored in a vulnerability reference table 604. In various embodiments, the correlation index table 604 may be stored in the app/library database 114 and/or the VFS 116.

The vulnerability engine 103 provides analysis of the statistical relevance of the features found in the target software application (e.g., AppAv1 in application index table 520) compared to at least one library signature of interest (e.g., Liba_v1, Libav2, etc., in library index table 320). Any given library may include a subset of code, such as for a particular class or function, which is selectively included in the target software application without including the entire library. Similarly any given library may have multiple versions and variations in signature that may enable identification of a specific version number. For example, the vulnerability engine 103 may use a combination of feature count (i.e., number of occurrences of a feature in the feature set) and feature uniqueness (i.e., a statistical quantification of the likelihood of the feature appearing randomly, in other known libraries, and/or in a sample of application programs written in that language regardless of library use) to calculate confidence scores associated with the set of features found in the code of the target software application compared to the set of features in the library signature. The library vulnerability engine 103 of the VFS 116 can then store that application signature for further processing in the app/library database 114 in the form of an application index table 520.

In various embodiments, different search and comparison algorithms may be used to determine the relevance of the set of features found in the target application software code (e.g., 430(1)). In one embodiment, the statistical relevance of the set of features is quantified in confidence scores. For example, term frequency-inverse document frequency (tf-idf) may be used to provide confidence scores, whereby the feature found is assigned a confidence value based on the commonality of that feature in the application software code compared to its commonality in a larger set of library or general software code.

Example User Device

Figure 7:
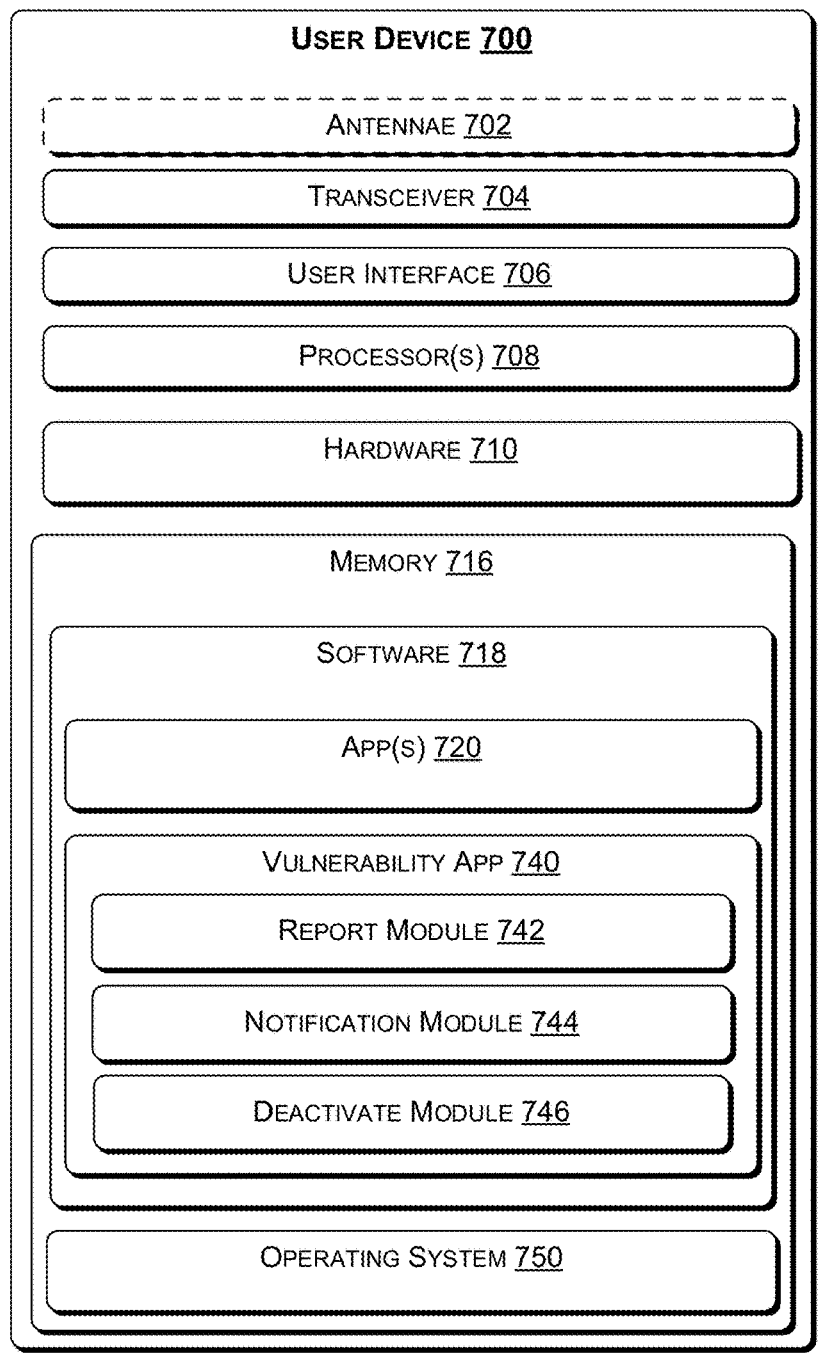
FIG. 7 illustrates a block diagram showing various components of an illustrative user device (UD) at a high level.

As discussed in the context of FIG. 1, the software vulnerability determination system in the architecture 100 involves several UD's. To that end, FIG. 7 illustrates a block diagram showing various components of an illustrative UD 700 at a high level. For discussion purposes, the illustration shows the UD 700 in the form of a wireless computing device.

The UD 700 may include one or more antennae 702; a transceiver 704 for cellular, Wi-Fi communication, and/or wired communication; a user interface 706; one or more processors 708; hardware 710; and memory 716. In some embodiments, the antennae 702 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 704, sometimes collectively referred to as a network interface, which is configured to receive and transmit digital data. In one embodiment, the UD 700 does not include an antenna 702 and communication with external components is via wired communication.

In one embodiment, the UD 700 includes a user interface 706 that enables a user to provide input and receive output from the UD 700. For example, the user interface 706 may include a data output device (e.g., visual display, audio speakers, haptic device, etc.,) that may be used to display notifications from the vulnerability engine 103 of the VFS 116. The user interface 706 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to enter a request for an application from the application store 110 (or update thereof) or to request the vulnerability engine 103 to determine whether one or more applications 720 stored in the UD 700 pose(s) a security concern.

The UD 700 may include one or more processors 708, which may be a single-core processor, a multi-core processor, a complex instruction set computing (CISC) processor, or another type of processor.

The hardware 710 may include a power source and digital signal processors (DSPs), which may include single-core or multiple-core processors. The hardware 710 may also include network processors that manage high-speed communication interfaces, including communication interfaces that interact with peripheral components. The network processors and the peripheral components may be linked by switching fabric. The hardware 710 may further include hardware decoders and encoders, a network interface controller, and/or a universal serial bus (USB) controller.

The memory 716 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 716 may store various software components or modules that are executable or accessible by the processor(s) 708 and controller(s) of the UD 700. The various components of the memory 716 may include software 718 and an operating system 720. The software 718 may include various applications 720 that may have been downloaded from the application stores 110 and/or provided directly by an application developer. The software 718 may also include a vulnerability application 740 having several modules. Each module may include routines, program instructions, objects, and/or data structures that perform particular tasks or implement particular abstract data types.

For example, the vulnerability application 740 of the UD 700 may include a report module 742 configured to determine what applications and versions thereof are available on the UD 700 and report it to the vulnerability engine 103. In various embodiments, such reporting may be performed periodically at predetermined intervals, when a new application is introduced to the UD 700, upon request from an operator of the UD, or upon request from the vulnerability engine 103 of the VFS 116.

The vulnerability application 740 may include a notification module 744 configured to receive notifications from the vulnerability engine 103 regarding whether one or more of the applications stored in the memory 716 of the UD 700 pose a security concern. In some embodiments, the deactivate module 746 may prevent the execution of an application that has been deemed by the vulnerability engine 103 to pose a security concern.

The operating system 750 may include components that enable the UD 700 to receive and transmit data via various interfaces (e.g., user controls, communication interface, and/or memory input/output devices), as well as process data using the processors 708 to generate output. The operating system 750 may include a presentation component that presents the output (e.g., display the data on an electronic display of the UD 700, store the data in memory 716, transmit the data to another electronic device, etc.). Additionally, the operating system 720 may include other components that perform various additional functions generally associated with an operating system 720.

Example Process

Figure 8:
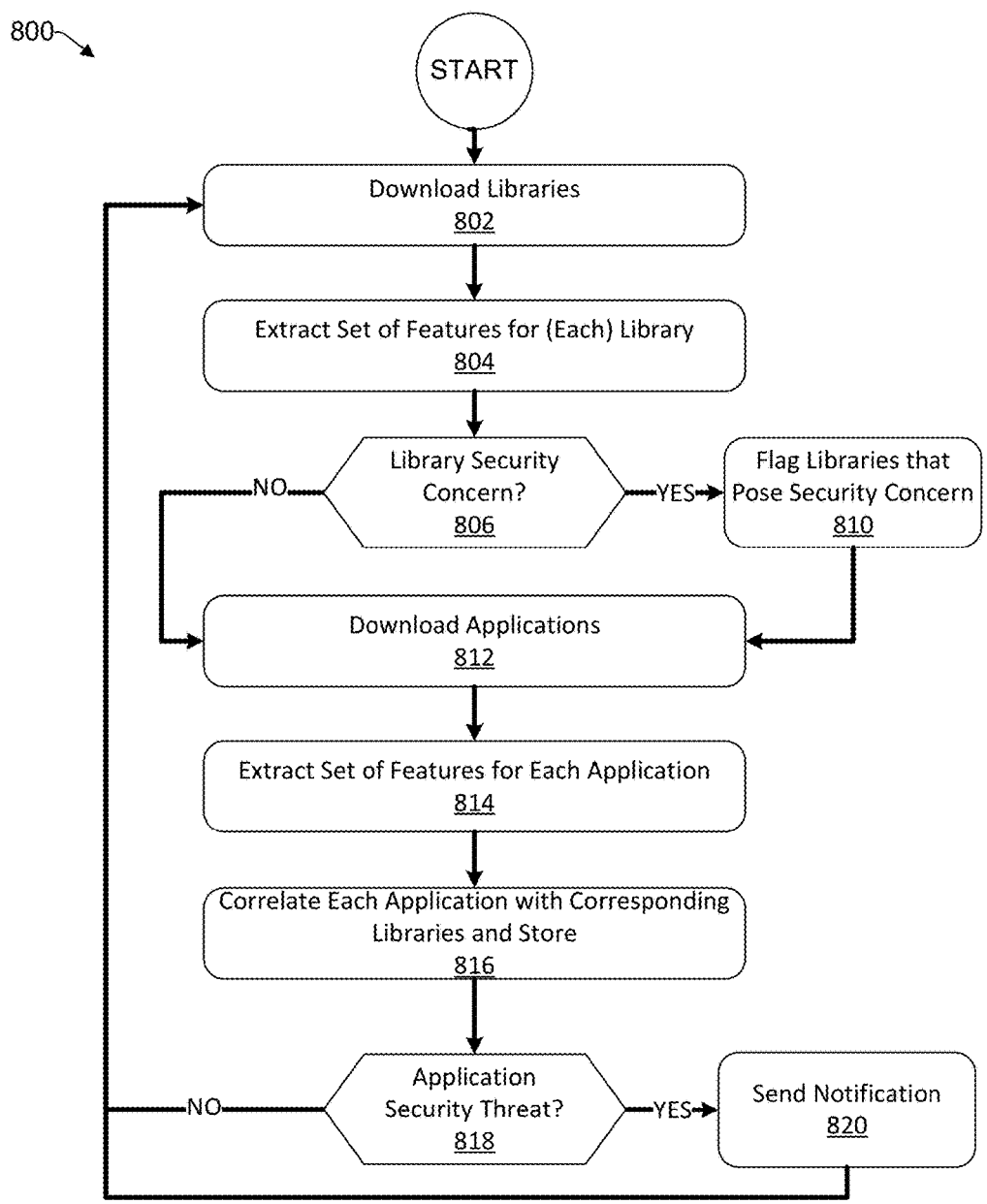
FIGS. 8 and 9 present illustrative processes for determining the vulnerability of an application and/or library via a remote server, consistent with exemplary embodiments.
Figure 9:
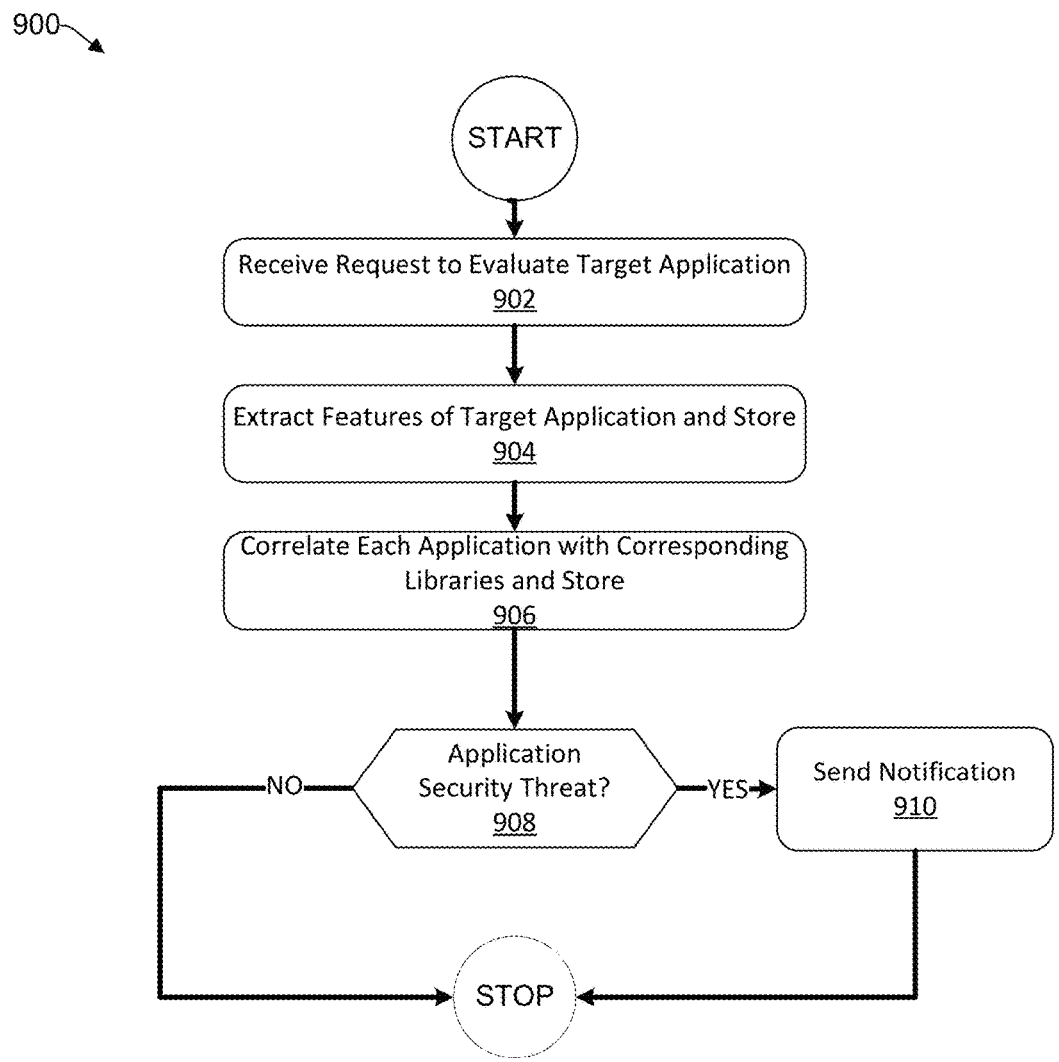

With the foregoing overview of the architecture 100, different phases of operation, and the components of a UD 700, it may be helpful now to consider a high-level discussion of example processes. To that end, FIGS. 8 and 9 present illustrative processes 800 and 900 for determining the vulnerability of an application and/or library via a remote server, such as the VFS 116. Process 800 describes a general operation phase while process 900 describes an interrupt driven aspect that may be performed after and/or during any block of process 800.

Processes 800 and 900 are illustrated as a collection of blocks in logical flowcharts, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the processes 800 and 900 are described with reference to the architecture 100 of FIG. 1.

At block 802, the vulnerability engine 103 of the VFS 116 downloads libraries 112 from various known locations. Such downloading of libraries may be performed at predetermined intervals (e.g., once per day), upon a trigger event (e.g., a new library is available at a known location), or upon request from the vulnerability engine 103. In one embodiment, libraries that are downloaded are stored in a database, represented by way of example as app/library database 114 in FIG. 1.

At block 804, for each library that has been downloaded, the vulnerability engine 103 extracts a set of features of the corresponding library and stores the set of features of the library in a library index table in a library database 114. In one embodiment, the version of the library is extracted as well.

At block 806, for each library that has been downloaded, it is determined whether the library poses a security concern. For example, a security concern may exist when an application that may use the library would be vulnerable to a malicious activity, such as Botnet, DDoS, Malware, etc.

Upon determining that there is a security concern for a library (i.e., "YES" at decision block 806), the process continues with block 810, where libraries that pose a security threat are flagged. In one embodiment, a library alert notification is sent to one or more authorized administrators and/or providers of the library that are associated with the security concern. The library alert notification may be sent in various ways, such as common short code (CSC) using a short message service (SMS), multimedia message service (MMS), e-mail, telephone, social media, etc. The process continues with block 812.

Returning to block 806, upon determining that there is no security concern (for each library respectively) (i.e., "NO" at decision block 806), the process continues with block 812.

At block 812, the vulnerability engine 103 of the VFS 116 downloads applications 110 from various known locations over the network 106. Similar to the downloading of libraries, the downloading of applications may be performed at predetermined intervals, upon a trigger event (e.g., a new application is available at a known location), upon request from the vulnerability engine 103, upon request from a UD (which may be from an end user or a developer of the application), etc.

At block 814, for each application, a set of features of the application are extracted and stored in an application index table of the application database. In one embodiment, the version of the application is extracted and stored as well. The application database may be the same as the library database (e.g., represented in FIG. 1 by the app/library database 114) or may be a separate database.

At block 816, for each application, the set of features of the application in the application index table are compared to the set of features of each of the libraries in the library index table to identify one or more libraries that are associated with the application. Put differently, it is determined what libraries an application may have used. In this regard, a vulnerability reference table is populated in a database (which may be the app/library database 114 or a standalone database) that stores, for each application, the name of libraries associated therewith.

At block 818, for each application, the vulnerability engine 103 determines whether at least one of the one or more libraries associated with an application has been flagged to be a security concern. For example, the application may be using one or more libraries that are vulnerable to a malicious activity, such as Botnet, DDoS, Malware, etc. In one embodiment, if an application is determined to be unlicensed, then the application is considered a security concern.

Upon determining that an application has a security concern (i.e., "YES" at decision block 818), the process continues with block 820, where an application alert notification is generated by the vulnerability engine 103. In various embodiments, an application alert notification is sent to a UD that has stored the application that has been identified to include a library that has been flagged to be a security concern. Alternatively or in addition, the application alert notification is sent to one or more authorized administrators, developers, and/or providers of the subject application, collectively referred to herein as an authorized representative. For example, a corporate application store that carries the vulnerable application may be notified. In one embodiment, the notification includes instructions to the UD to disable the offending application such that it cannot be launched on the UD.

In various embodiments, the process 800 may be initiated or repeated upon a trigger event (e.g., a request from the vulnerability engine 103 of the VFS 116, or be performed at predetermined intervals. To that end, upon determining that the application does not have a security concern (i.e., "NO" at decision block 818 or upon completion of sending the notification in block 820), the process returns to block 802 where new libraries that are available from known locations are downloaded to repeat the process.

Reference now is made to process 900 in FIG. 9, which describes an example interrupt driven aspect of the present application. At block 902, a request is received by the vulnerability engine 103 of the VFS 116 from a UD over the network 106 to verify a security of the target application. In various scenarios, the UD may be related to an end user of the application or an application developer who wants to confirm that the target application does not include any libraries that may pose a security concern.

At block 904, a set of features of the target application are extracted and stored in the application index table of the application database, which may be the app/library database 114. In one embodiment, the version of the application is extracted and stored as well.

At block 906, the set of features of the target application (i.e., stored in the application index table) is compared to the set of features of each of the libraries in the library index table to identify one or more libraries that are associated with the target application. Put differently, it is determined what libraries may have used in the target application. The results of the correlation are stored in the vulnerability reference table of the app/library database 114.

At block 908, the vulnerability engine 103 determines whether at least one of the one or more libraries associated with the target application has been flagged to be a security concern. In one embodiment, if an application is determined to be unlicensed, then it considered a security concern as well.

Upon determining that the target application has a security concern (i.e., "YES" at decision block 908), the process continues with block 910, where an application alert notification is generated by the vulnerability engine 103. In various embodiments, this application alert notification is sent to the requestor UD that has stored thereon the target application (which has been identified to include a library that has been flagged to be a security concern). Alternatively or in addition, the application alert notification is sent to an authorized representative. In one embodiment, the notification includes instructions to the UD to disable the target application such that the target application cannot be launched on the UD.

By virtue of the concepts discussed herein, the UD is more secure while it consumes less power and operates faster. That is because unlike anti-virus software that runs on a UD, valuable resources, such as memory storage space for the anti-virus software, processing power for evaluating suspect programs, and power to run the anti-virus software are not required. Rather, the determination of vulnerable applications is provided by a remote system of the VFS 116 having a vulnerability engine 103, thereby substantially disburdening the UD from identifying the vulnerability of the applications stored on the UD. Moreover, in some scenarios, applications that have been identified to be associated with libraries that pose a security concern are prevented from being launched.

Example Computer Platform

Figure 10:
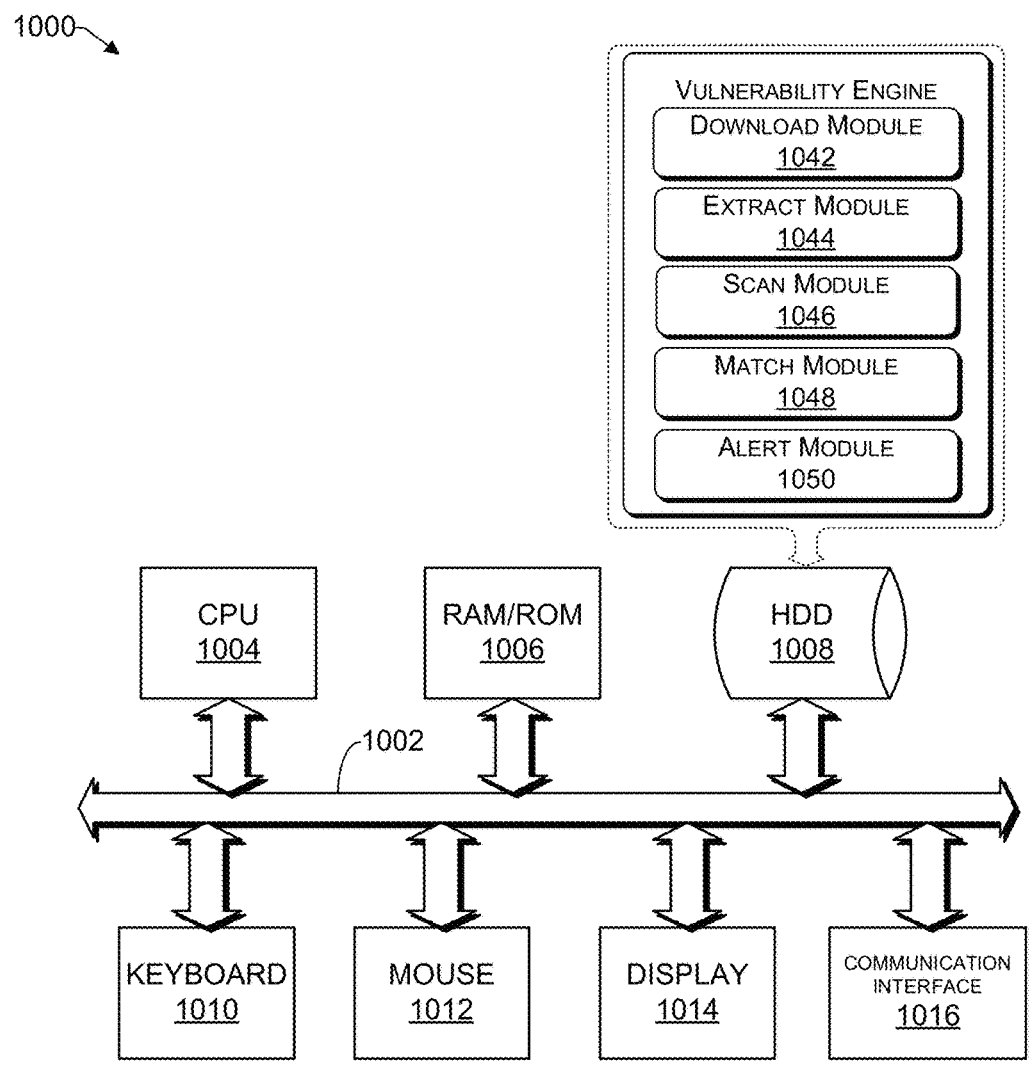
FIG. 10 provides a functional block diagram illustration of a computer hardware platform.

As discussed above, functions relating to detecting the vulnerability of applications can be performed with the use of one or more computing devices connected for data communication via wireless or wired communication, as shown in FIG. 1 and in accordance with the processes of FIGS. 8 and 9. An exemplary computing device in the form of a user device 700 has been discussed above with respect to FIG. 7. FIG. 10 provides a functional block diagram illustration of a computer hardware platform. In particular, FIG. 10 illustrates a network or host computer platform 500, as may typically be used to implement a server, such as the VFS 116, app/library database 114, or CRM server 118 of FIG. 1.

The computer platform 1000 may include a central processing unit (CPU) 1004, random access memory (RAM) and/or read only memory (ROM) 1006, a hard disk drive (HDD) 1008, a keyboard 1010, a mouse 1012, and display 1014, which are connected to a system bus 1002.

In one embodiment, the HDD 1008, has capabilities that include storing a program that can execute various processes, such as vulnerability engine 1040, in a manner described herein. The vulnerability engine 1040 may have various modules configured to perform different functions.

For example, there may be a download module 1042 configured to download libraries and/or applications from known locations, from a UD, and/or from an application developer (which may be from a UD). There may be an extract module 1044 configured to extract features and versions of a library and/or an application. There may be a scan module 1046 configured to scan a library for a potential vulnerability. There may be a match module 1048 configured to match an application with its corresponding libraries. There may also be an alert module 1050 operative to alert one or more recipients of a security concern regarding a library that has been identified to pose a security concern and/or an application that is associated with such a library.

In one example a program, such as Apache™, can be stored for operating the system as a Web server. In one embodiment, the HDD 1008 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a vulnerability engine software stored in the storage device, wherein an execution of the software by the processor configures the computing device to perform acts comprising:
      downloading libraries from a first one or more locations over the network;
      storing the libraries in a database;
      extracting, for each library, a set of features of the library and storing the set of features of the library in a library index table of the database, wherein the set of features that are extracted from each library include unique features that survive obfuscation when compiled into an executable application;
      determining, for each library, whether the library poses a security concern and flagging each library that poses a security concern in the library index table;
      downloading applications from a second one or more locations over the network;
      storing the applications in the database;
      extracting, for each application, a set of features of the application and storing the set of features of the application in an application index table of the database;
      comparing, for each application, the set of features of the application to the set of features of each of the libraries in the library index table to identify which libraries are associated with the application;
      storing, for each application, a name of the application and names of the associated libraries in a vulnerability reference table in the database; and
      upon determining that at least one of the one or more libraries associated with an application is flagged to be a security concern, disabling the application on a user device (UD) having the application with at least one of the one or more libraries having been flagged to be a security concern.

2. The computing device of claim 1, wherein execution of the vulnerability engine software further configures the computing device to perform acts comprising, for each application:
   upon determining that at least one of the one or more libraries associated with an application is flagged to be a security concern, sending a notification of the security concern to at least one of: (i) the UD, and (ii) an authorized representative of the application.

3. The computing device of claim 1, wherein execution of the vulnerability engine software further configures the computing device to perform acts comprising:
   receiving a request from the UD (UD) over the network to verify a security of a target application, wherein the request includes an identifier of the target application; and
   upon determining that the target application is not included in the vulnerability reference table:
      requesting the target application from at least one of: (i) the UD and (ii) an application store;
      upon receiving the target application:
         storing the target application in the database;
         extracting a set of features of the target application and storing the set of features of the target application in the application index table of the database;
         comparing the set of features of the target application to the set of features of each of the libraries in the library index table to identify what libraries are associated with the target application; and
         storing a name of the target application and names of the associated libraries in a vulnerability reference table in the database.

4. The computing device of claim 3, wherein execution of the vulnerability engine software further configures the computing device to perform acts comprising:

upon determining that a library associated with the target application is flagged to be a security concern, sending a notification of the security concern to the UD.

5. The computing device of claim 3, wherein the request to verify the security of the target application is received from the UD of an application developer and the target application is a new application.

6. The computing device of claim 3, wherein the request to verify the security of the target application includes a facsimile of the target application.

7. The computing device of claim 3, wherein the identifier of the target application comprises a name of the target application and a version thereof.

8. The computing device of claim 1, wherein execution of the vulnerability engine software further configures the computing device to perform acts comprising:
   upon determining that at least one of the one or more libraries is flagged to be a security concern, sending a notification of the security concern to an authorized representative of the library.

9. The computing device of claim 1, wherein the set of features that are extracted from each application include a version of the application.

10. A non-transitory computer readable storage medium tangibly embodying a computer readable program code having computer readable instructions that, when executed, causes a computer device to carry out a method of determining a vulnerability of software, the method comprising:
   downloading libraries from a first one or more locations over the network;
   storing the libraries in a database;
   extracting, for each library, a set of features of the library and storing the set of features of the library in a library index table of the database, wherein the set of features that are extracted from each library include unique features that survive obfuscation when compiled into an executable application;
   determining, for each library, whether the library poses a security concern and flagging each library that poses a security concern in the library index table;
   downloading applications from a second one or more locations over the network;
   storing the applications in the database;
   extracting, for each application, a set of features of the application and storing the set of features of the application in an application index table of the database;
   comparing, for each application, the set of features of the application to the set of features of each of the libraries in the library index table to identify which libraries in the library index table are associated with the application;
   storing, for each application, a name of the application and names of the associated libraries in a vulnerability reference table in the database; and
   upon determining that at least one of the one or more libraries associated with an application is flagged to be a security concern, disabling the application on a user device (UD) having the application with at least one of the one or more libraries having been flagged to be a security concern.

11. The non-transitory computer readable storage medium of claim 10, wherein the method further comprises, for each application, upon determining that at least one of the one or more libraries associated with an application is flagged to be a security concern, sending a notification of the security concern to the UD.

12. The non-transitory computer readable storage medium of claim 10, wherein the method further comprises:
   receiving a request from the UD over the network to verify a security of a target application, wherein the request includes an identifier of the target application; and
   upon determining that the target application is not included in the vulnerability reference table:
      requesting the target application from at least one of: (i) the UD and (ii) an application store;
      upon receiving the target application:
         storing the target application in the database;
         extracting a set of features of the target application and storing the set of features of the target application in the application index table of the database;
         comparing the set of features of the target application to the set of features of each of the libraries in the library index table to identify what libraries are associated with the target application; and
         storing a name of the target application and names of the associated libraries in a vulnerability reference table in the database.

13. The non-transitory computer readable storage medium of claim 12, the method further comprising, upon determining that a library associated with the target application is flagged to be a security concern, sending a notification of the security concern to the UD.

14. A method of determining a vulnerability of software, the method comprising:
   downloading libraries from a first one or more locations over the network;
   storing the libraries in a database;
   extracting, for each library, a set of features of the library and storing the set of features of the library in a library index table of the database, wherein the set of features that are extracted from each library include unique features that survive obfuscation when compiled into an executable application;
   determining, for each library, whether the library poses a security concern and flagging each library that poses a security concern in the library index table;
   downloading applications from a second one or more locations over the network;
   extracting, for each application, a set of features of the application and storing the set of features of the application in an application index table of the database;
   comparing, for each application, the set of features of the application to the set of features of each of the libraries in the library index table to identify which libraries in the library index table are associated with the application;
   storing, for each application, a name of the application and names of the associated libraries in a vulnerability reference table in the database; and
   upon determining that at least one of the one or more libraries associated with an application is flagged to be a security concern, disabling the application on a user device (UD) having the application with at least one of the one or more libraries having been flagged to be a security concern.

15. The method of claim 14, further comprising, for each application, upon determining that at least one of the one or more libraries associated with an application is flagged to be a security concern, sending a notification of the security concern to the UD.

16. The method of claim 14, further comprising:
receiving a request from the UD over the network to verify a security of a target application, wherein the request includes an identifier of the target application; and
upon determining that the target application is not included in the vulnerability reference table:
requesting the target application from at least one of: (i) the UD and (ii) an application store;
upon receiving the target application:
  storing the target application in the database;
  extracting a set of features of the target application and storing the set of features of the target application in the application index table of the database;
  comparing the set of features of the target application to the set of features of each of the libraries in the library index table to identify what libraries are associated with the target application; and
  storing a name of the target application and names of the associated libraries in a vulnerability reference table in the database.

\* \* \* \* \*